(No Model.)

T. J. PRICE.
SAD IRON HEATER.

No. 246,687. Patented Sept. 6, 1881.

WITNESSES.
Geo. W. Price
W. T. Price

INVENTOR.
Thos. J. Price

UNITED STATES PATENT OFFICE.

THOMAS J. PRICE, OF MACOMB, ASSIGNOR OF ONE-HALF TO WILLIAM A. MORTON, OF GALESBURG, ILLINOIS.

SAD-IRON HEATER.

SPECIFICATION forming part of Letters Patent No. 246,687, dated September 6, 1881.

Application filed June 23, 1881. (No model.)

*To all whom it may concern:*

Be it known that I, THOMAS J. PRICE, of Macomb, in the county of McDonough and State of Illinois, have invented new and useful Improvements in Sad-Iron Heaters, of which the following is a full, clear, and exact description, which will enable others skilled in the art to which it appertains to make and use the same, reference being had to the accompanying drawings, and to the letters of reference marked thereon, which form a part of this specification.

The nature and object of this invention are to construct means whereby the lids of a sad-iron heater can be raised by the weight of the sad-iron; and its novelty consists in a lever-frame having its inner arms bent inward, so as to form bearings, in combination with a slotted lid having raised receptacles formed in each side, as hereinafter described, and pointed out in the claim.

Figure 1:
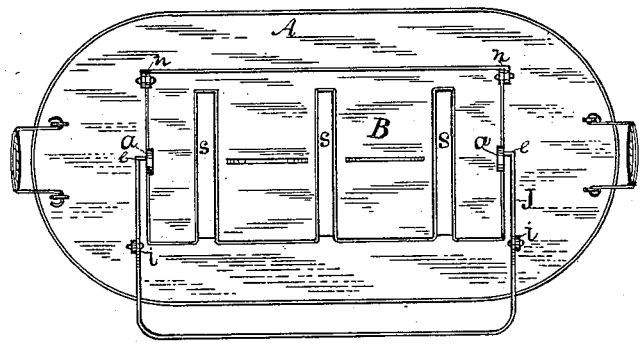
Figure 2:
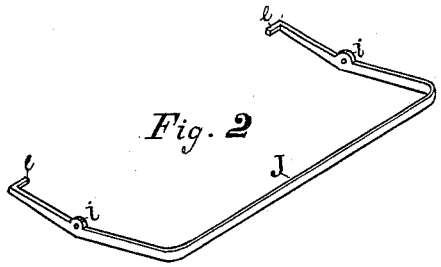
Figure 3:
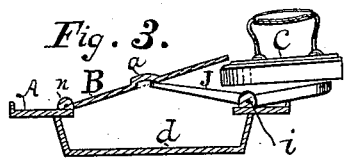

In the drawings, Figure 1 is a plan. Fig. 2 represents the lever-frame in perspective. Fig. 3 is a cross-section of Fig. 1, showing the manner of inserting the sad-iron.

Similar letters indicate like parts in each figure.

A represents the top plate of the heater, to which is attached the pot $d$. (See Fig. 3.)

B represents the lid, which has three slots, $s\ s\ s$, and it is hinged to the top A at $n\ n$. At each end of the lid B, at $a\ a$, raised receptacles are formed, which are to receive the inner bent ends, $e\ e$, on the lever-frame J, which frame is constructed as shown in Fig. 2, having bearings $e\ e$ formed on its inner arms, and it is pivoted to the top of the heater A at $i\ i$.

The operation is as follows: The heater is placed on the stove after the stove-lids have been removed, the pot $d$ going down close to the fire, so that the heat acts directly on its bottom, and when sufficiently hot the sad-iron is placed on the outer rim of the lever-frame J, opposite either of the slots $s\ s\ s$. The weight of the sad-iron, by means of the bearings $e\ e$ on the inner arms of the lever-frame, raises up the lid, as shown in Fig. 3, and the sad-iron is passed under the lid into the pot $d$. The handle of the sad-iron passes in the slot $s$, and as soon as the sad-iron is on the bottom of the pot $d$ the lid, of its own weight, closes down, leaving the handle of the sad-iron above the lid sufficient to be grasped with the hand. When the sad-iron is taken out it raises up the lid; and to prevent the sad-iron from coming in contact with the lever-frame J, the outer rim of said frame is made so heavy that it drops down out of the way by means of its own weight.

Having thus fully described my invention, what I claim as new, and desire to secure by Letters Patent, is—

In sad-iron heaters, the lever-frame J, having its inner arms bent inward, forming bearings $e\ e$, in combination with the slotted lid B, having raised receptacles $a\ a$, substantially as shown and described, for the purpose set forth.

THOS. J. PRICE.

Witnesses:
GEO. W. PRICE,
W. T. PRICE.